United States Patent
Joshi et al.

(10) Patent No.: US 10,949,541 B1
(45) Date of Patent: Mar. 16, 2021

(54) RATING COMMUNICATING ENTITIES BASED ON THE SHARING OF INSECURE CONTENT

(71) Applicant: Symantec Corporation, Mountain View, CA (US)

(72) Inventors: Anuradha Joshi, Pune (IN); Anand Darak, Pune (IN)

(73) Assignee: NortonLifeLock, Inc., Tempe, AZ (US)

(*) Notice: Subject to any disclaimer, the term of this patent is extended or adjusted under 35 U.S.C. 154(b) by 202 days.

(21) Appl. No.: 16/116,815

(22) Filed: Aug. 29, 2018

(51) Int. Cl.
*G06F 21/57* (2013.01)
*G06F 21/56* (2013.01)

(52) U.S. Cl.
CPC .......... *G06F 21/577* (2013.01); *G06F 21/56* (2013.01); *G06F 2221/034* (2013.01)

(58) Field of Classification Search
CPC .. G06F 16/248; G06F 16/951; G06F 16/9535; G06F 16/9566; G06F 16/9577; G06F 16/958; G06F 16/972; G06F 3/0482; G06F 3/04847; G06F 40/186; G06F 15/16; G06F 21/577; G06F 21/56; G06F 2221/034; H04L 63/102; H04L 63/168; H04L 67/02; H04L 43/026; H04L 43/08; H04L 61/1511; H04L 63/10; H04L 63/1425; H04L 63/1433; H04L 67/322; G06Q 20/3224; G06Q 20/389; G06Q 20/4016; G06Q 20/405; G06Q 30/0255
See application file for complete search history.

(56) References Cited

U.S. PATENT DOCUMENTS

| | | | |
|---|---|---|---|
| 8,479,289 B1* | 7/2013 | Krishnappa | G06F 21/56 726/23 |
| 8,826,426 B1* | 9/2014 | Dubey | H04L 63/14 726/22 |
| 9,591,012 B1* | 3/2017 | Pierson | H04L 63/1433 |
| 10,290,058 B2* | 5/2019 | Liao | G06Q 40/06 |
| 2005/0262556 A1* | 11/2005 | Waisman | H04L 63/0236 726/22 |
| 2010/0146639 A1* | 6/2010 | Kim | G06Q 10/10 726/28 |
| 2011/0125793 A1* | 5/2011 | Erhart | H04L 51/32 707/776 |

(Continued)

*Primary Examiner* — J. Brant Murphy
(74) *Attorney, Agent, or Firm* — Brill Law Office; Jeffrey Brill

(57) ABSTRACT

Communications received by a computing device originating from communicating entities that are members of the same group(s) as a user are tracked. A corresponding unique identifier is maintained for each such communicating entity, and an associated security rating is configured. A security analysis is performed on content received by the computing device from these communicating entities. The security ratings associated with given communicating entities are adjusted, responsive to given security analyses of content received by the computing device from these associated communicating entities, where such an analysis identifies security concerns. Responsive to the security rating of a specific communicating entity exceeding a predefined threshold, one or more security actions are taken to prevent the user of the computing device from being exposed to communication from that communicating entity.

20 Claims, 4 Drawing Sheets

(56) References Cited

U.S. PATENT DOCUMENTS

| | | | | |
|---|---|---|---|---|
| 2011/0289204 A1* | 11/2011 | Hansson | ............. | H04L 67/1008 |
| | | | | 709/224 |
| 2011/0321160 A1* | 12/2011 | Mohandas | ............. | G06F 21/56 |
| | | | | 726/22 |
| 2013/0232204 A1* | 9/2013 | Barney | ................... | H04L 51/02 |
| | | | | 709/206 |
| 2013/0275999 A1* | 10/2013 | Gordon | ................... | G06F 21/56 |
| | | | | 719/318 |
| 2013/0290451 A1* | 10/2013 | Harik | ...................... | H04L 51/12 |
| | | | | 709/206 |
| 2014/0279684 A1* | 9/2014 | Liao | ........................ | G06Q 40/06 |
| | | | | 705/36 R |
| 2015/0120633 A1* | 4/2015 | Norlander | ............. | G16H 20/30 |
| | | | | 706/46 |
| 2015/0319203 A1* | 11/2015 | Jeremias | ............ | G06Q 30/0641 |
| | | | | 715/753 |
| 2016/0065608 A1* | 3/2016 | Futty | ....................... | H04L 63/10 |
| | | | | 726/25 |
| 2016/0255139 A1* | 9/2016 | Rathod | ................. | H04L 51/046 |
| | | | | 709/203 |
| 2016/0381064 A1* | 12/2016 | Chan | ....................... | H04L 51/32 |
| | | | | 726/25 |
| 2017/0068815 A1* | 3/2017 | Lu | .......................... | G06F 21/554 |
| 2017/0093776 A1* | 3/2017 | Dixon | ..................... | H04L 51/22 |
| 2017/0359220 A1* | 12/2017 | Weith | ...................... | G06F 16/25 |
| 2018/0013772 A1* | 1/2018 | Schmidtler | ............ | H04L 63/145 |
| 2018/0351925 A1* | 12/2018 | Badri | ................... | H04L 63/0861 |
| 2019/0238571 A1* | 8/2019 | Adir | ........................ | H04L 51/12 |
| 2019/0266325 A1* | 8/2019 | Scherman | .............. | G06F 40/289 |
| 2019/0294792 A1* | 9/2019 | Singh | ....................... | G06N 20/00 |
| 2019/0311310 A1* | 10/2019 | Miller | ................. | G06Q 10/0635 |
| 2019/0364001 A1* | 11/2019 | Dotan-Cohen | ...... | G06Q 10/107 |

* cited by examiner

RATING COMMUNICATING ENTITIES BASED ON THE SHARING OF INSECURE CONTENT

TECHNICAL FIELD

This disclosure pertains generally to computing device security, and more specifically to rating communicating entities based on the sharing of insecure content, and protecting users from shared insecure content.

BACKGROUND

Mobile computing device users face a growing threat to security and privacy on the internet, from computer viruses and other forms of malware. Social apps with communication features such as chat and direct messaging are often used to spread malicious content, often without the knowledge of the users involved. The same is true of other communication apps, such as email and text.

With so many social networking apps, messaging apps, email apps, etc., a user is often added to multiple groups. Not all of the members of a given group are necessarily in the user's contacts, nor does the user necessarily know all of the members of the given group. Many users share/forward different content within such groups. With or without the knowledge of the sharing users, some of the content distributed within groups is insecure/malicious. Group members are thus prone to the risk of accidentally being part of such sharing/forwarding, or of being victimized by such content. Many users are not knowledgeable about computer security, and are often not careful about the security or privacy aspects of such shared content. Users in groups are thus vulnerable to having their devices infected by shared malicious content, and often unknowingly serve as a medium for spreading these infections to other users.

For example, there could be group members who, due to a general lack of computer security awareness, continue to forward communications with lucky draw or other offer links, which tend to be malicious, breached and/or fake. Clicking on such links is a security risk to the receiving user. Accidently forwarding such links puts the user's contacts at risk. Typically, insecure content is forwarded and otherwise shared by certain group members. A user who is a member of a group that includes such members is unknowingly prone to these risks.

It would be desirable to address these issues.

SUMMARY

A user of a computing device is protected from insecure content disseminated by communicating entities (e.g., other users) that are members of at least one group of which the user is a member. In one embodiment, the computing device is in the form of a mobile computing device such as a smartphone or tablet, and some or all of the functionality described herein is performed by an app running thereon. Communications received by the computing device and originating from communicating entities that are members of one or more of the same group(s) as the user are tracked. For example, communications received by the computing device via a plurality of user-level communication applications can be monitored (e.g., messaging apps, email apps, contacts apps, social networking apps, etc.).

A corresponding unique identifier is maintained for each communicating entity which is a member of at least one group of which the user is a member. Additional data concerning these communicating entities may also be maintained. Such data can be gleaned from, for example, one or more user-level communication applications. For each communicating entity which is a member of one or more of the same group(s) as the user, an associated security rating is configured. Each security rating comprises a quantification of a security risk of receiving communication from the associated communicating entity. In some embodiments, security ratings are initialized to a default value, such as zero.

A security analysis is performed on content received by the computing device from communicating entities that are members of one or more of the same group(s) as the user. This can take the form of, for example, intercepting communications received by the computing device from these communicating entities, and scanning content of the intercepted communications. Different forms of security analysis can be used in different embodiments, such as scanning files using a set of signatures of known malicious code, comparing links embedded in content to known or suspected malicious websites, analyzing content for patterns associated with spam or phishing, running active content in a sandbox and subjecting the running active content to heuristic or other type of analysis, etc.

Security ratings associated with given communicating entities are adjusted, responsive to given security analyses of content received by the computing device from these associated communicating entities, where such an analysis identifies one or more given security concerns. Different adjustments to security ratings can be made in response to different incidents, with the adjustments being quantitatively proportional to different seriousness levels associated with the associated security analyses of received content.

Responsive to the security rating associated with a specific communicating entity exceeding a predefined threshold, one or more security actions can be taken to prevent the user of the computing device from being exposed to communication from that communicating entity. For example, actions that can be taken include blocking communications from the specific communicating entity, redacting communications from the specific communicating entity, auto-deleting messages or files from the specific communicating entity, automatically removing the user from at least one group of which the specific communicating entity is a member, transmitting warning notification(s) to the user, the specific communicating entity, other members of groups of which the communicating entity is a member, etc. In one embodiment, machine learning driven by telemetry received from multiple endpoints is used to set the predetermined threshold.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
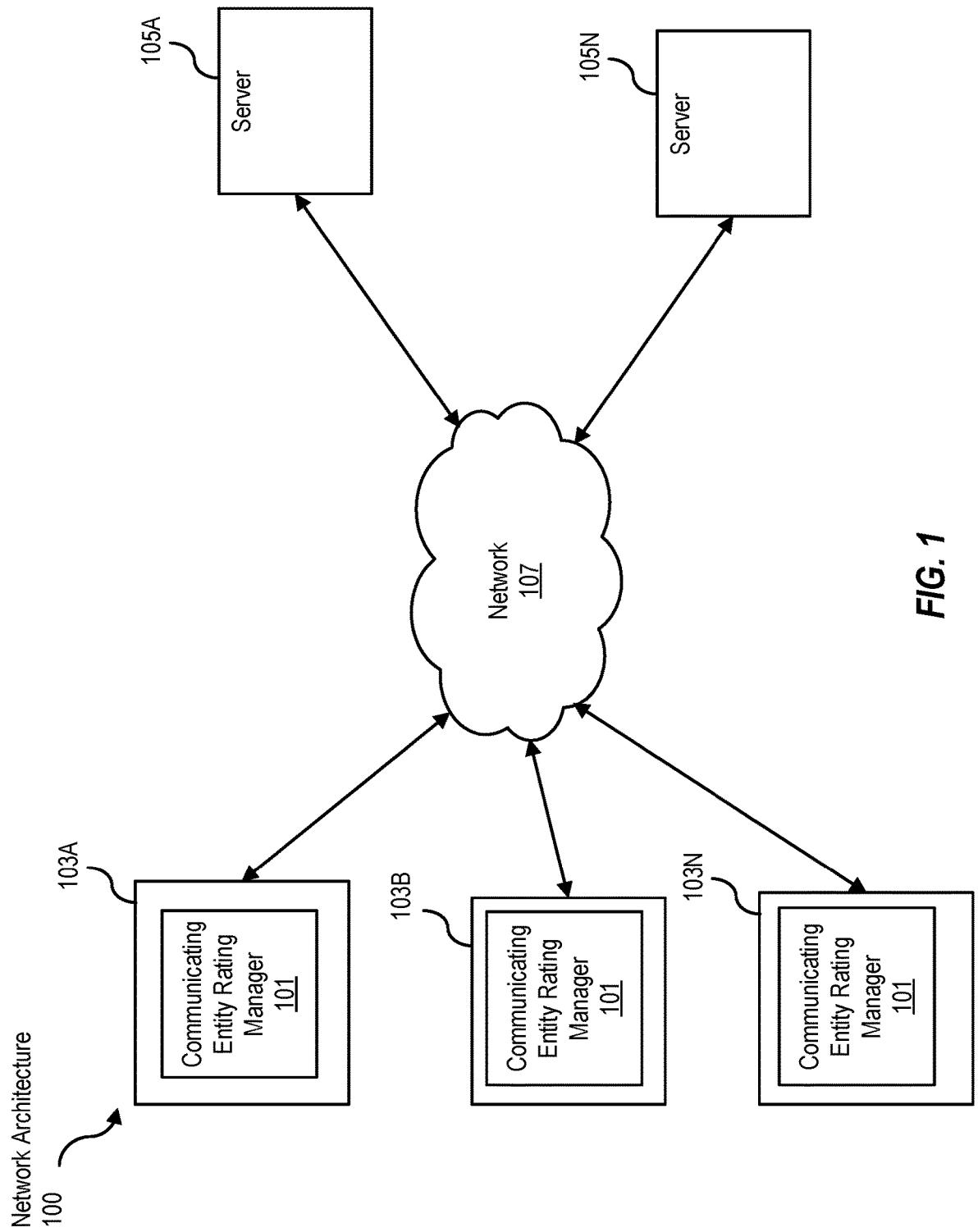
FIG. 1 illustrates a network architecture in which a communicating entity rating manager can operate, according to some embodiments.

FIG. 1 is a block diagram illustrating an exemplary network architecture 100 in which a communicating entity rating manager 101 can be implemented. The illustrated network architecture 100 comprises multiple clients 103A, 103B and 103N, as well as multiple servers 105A and 105N. In FIG. 1, a communicating entity rating manager 101 is illustrated as residing on each client 103A-N. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of desktop/laptop computers, or mobile computing devices, comprising portable computer systems capable of connecting to a network 107 and running applications (e.g., smartphones, tablet computers, wearable computing devices, etc.).

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
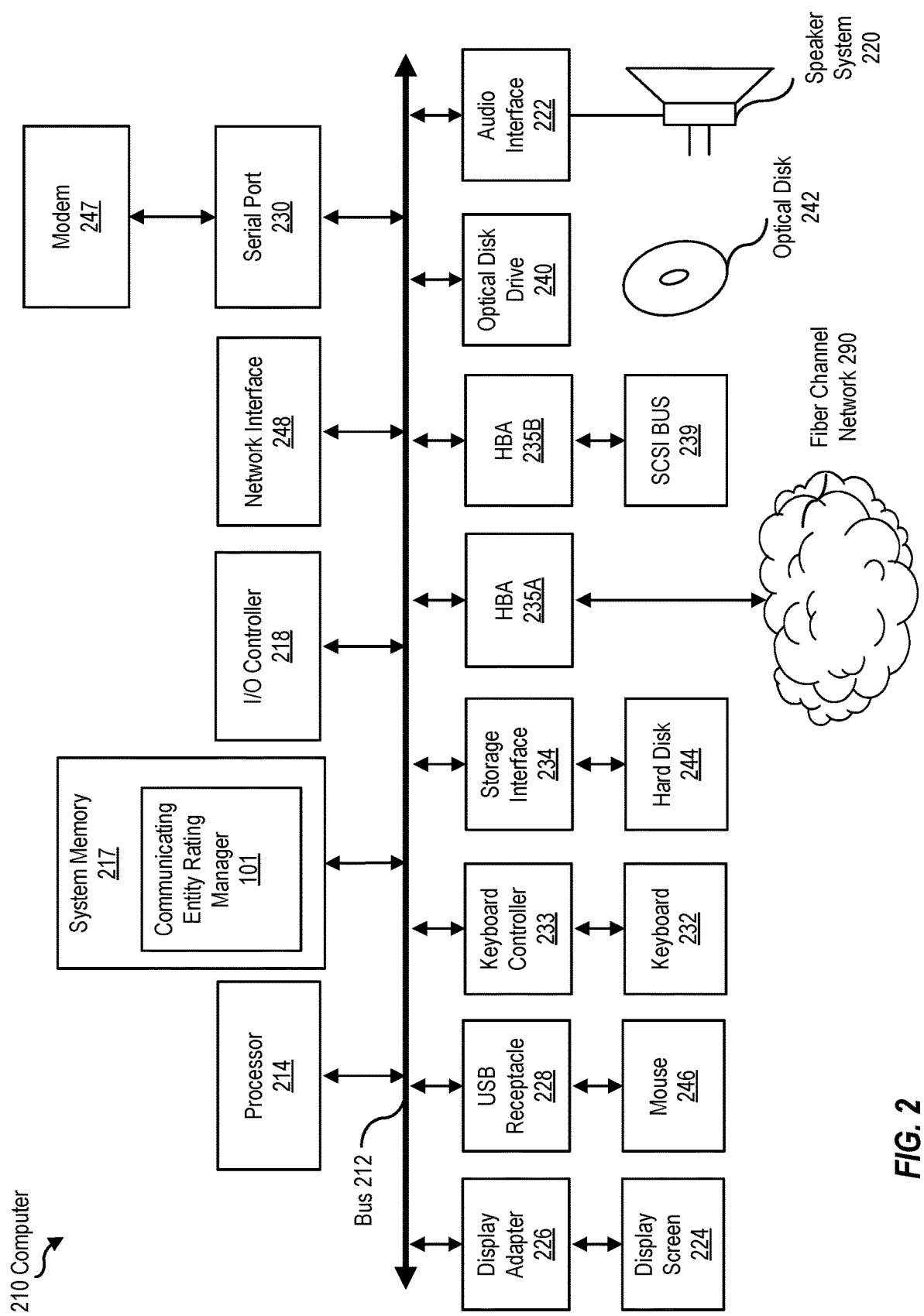
FIG. 2 is a block diagram of a computer system suitable for implementing a communicating entity rating manager, according to some embodiments.

FIG. 2 is a block diagram of a computer system 210 suitable for implementing a communicating entity rating manager 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) ports 228, serial ports 230, etc., a keyboard controller 233 communicatively coupled to a keyboard 232, a storage interface 234 communicatively coupled to at least one hard disk 244 (or other form(s) of data storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the communicating entity rating manager 101 is illustrated as residing in system memory 217. The workings of the communicating entity rating manager 101 are explained in greater detail below in conjunction with FIGS. 3-5.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
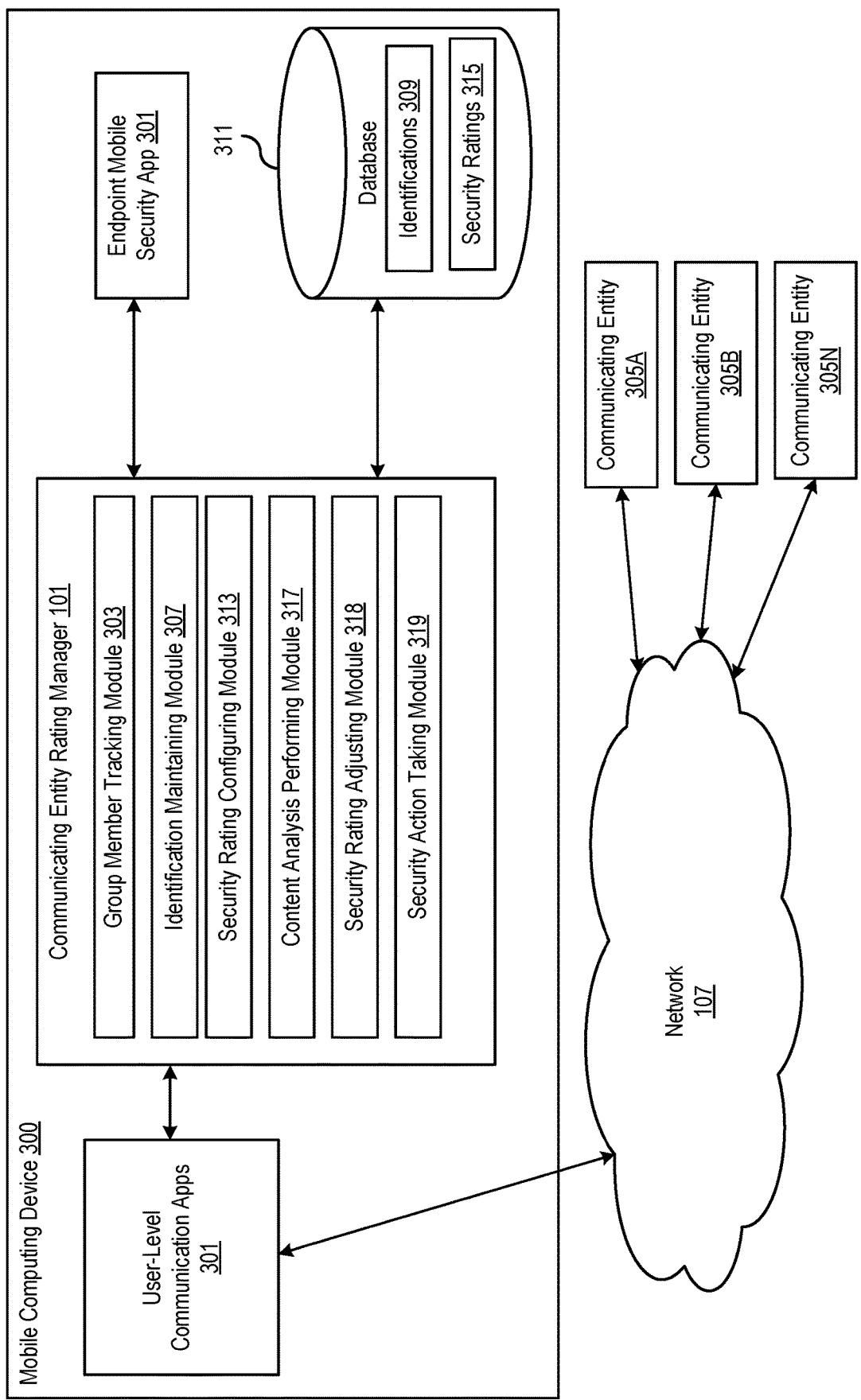
FIG. 3 is a block diagram of a communicating entity rating manager operating on a computing device in a networked environment, according to some embodiments.

FIG. 3 illustrates the operation of a communicating entity rating manager 101, according to some embodiments. As described above, the functionalities of the communicating entity rating manager 101 can reside on a client 103, a server 105, or be distributed between multiple computer systems 210, including within a cloud-based computing environment in which the functionality of the communicating entity rating manager 101 is provided as a service over a network 107.

FIG. 3 illustrates a specific multiple module instantiation of a communicating entity rating manager 101, according to some embodiments. It is to be understood that although the communicating entity rating manager 101 is illustrated as a single entity, the illustrated communicating entity rating manager 101 represents a collection of functionalities, which can be instantiated as a single or multiple modules as desired (an instantiation of specific, multiple modules of the communicating entity rating manager 101 according to one embodiment is illustrated in FIG. 3). It is to be understood that the modules of the communicating entity rating manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the communicating entity rating manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

Figure 4:
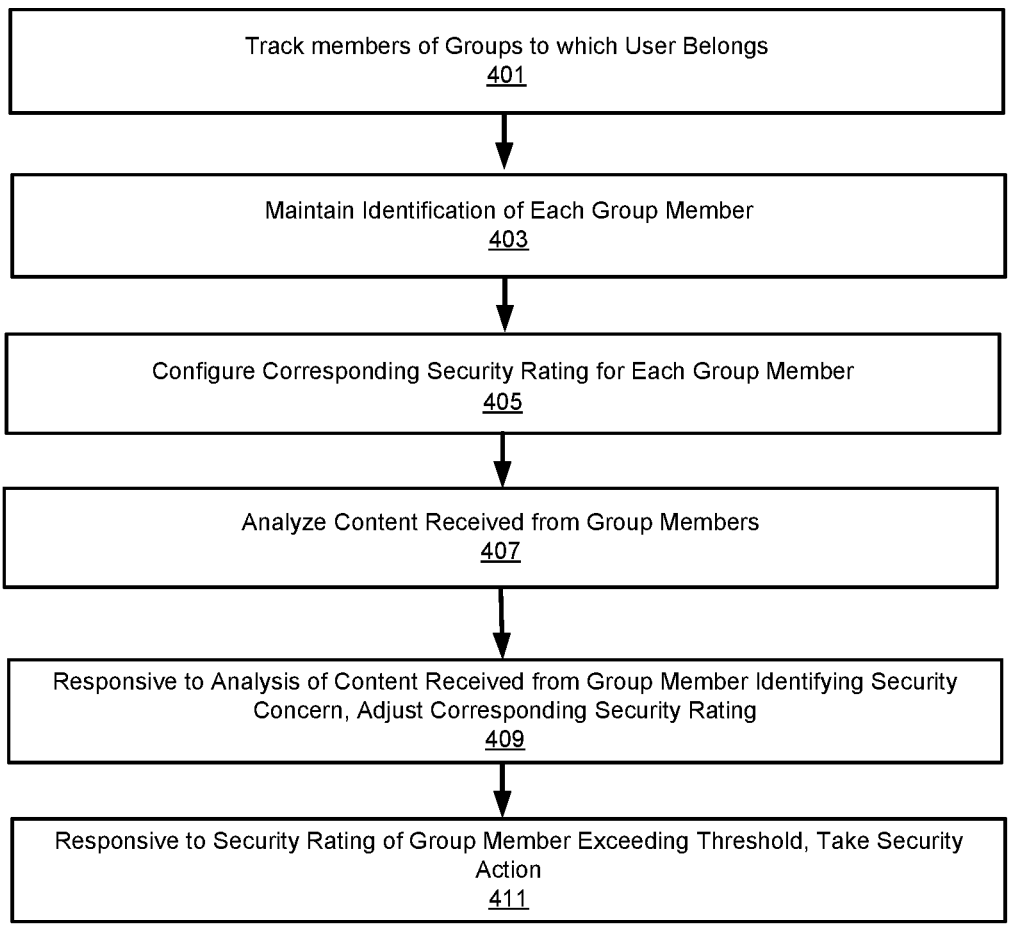
FIG. 4 is a flowchart illustrating operations of a communicating entity rating manager, according to some embodiments.

FIG. 4 illustrates steps executed by the communicating entity rating manager 101, according to some embodiments. For clarity of description, the subject matter illustrated in FIGS. 3 and 4 is described together below.

In the embodiment illustrated in FIG. 3, a communicating entity rating manager 101 runs on a mobile computing device 300, such as a smartphone or tablet, which is connected to a network 107. In one embodiment, the communicating entity rating manager 101 is implemented in the form of an app 301 which runs on the mobile computing device 300 (e.g., an Android app, an iOS app, etc.). In some embodiments, the communicating entity rating manager 101 is instantiated as part of or otherwise in conjunction with an endpoint mobile security app 301, which may in turn interface with a backend/cloud based security system (not illustrated). Although FIG. 3 illustrates the communicating entity rating manager 101 executing on a mobile computing device 300, it is to be understood that in other embodiments the communicating entity rating manager 101 can be present on other types of computer systems 210 (e.g., desktops, rack mounted servers, etc.).

Various apps 301 are installed on the mobile computing device 300 on which the communicating entity rating manager 101 is present. Among these various apps 301 are typically some which the user of the mobile computing device 300 can use to communicate with other users, such as, for example, social media apps, direct messaging apps, texting apps, email apps, contacts apps, etc. For each such user-level communication app 301, a group member tracking module 303 of the communicating entity rating manager 101 tracks 401 the members of associated groups to which the user of the mobile computing device 300 belongs (e.g., groups within given social media platforms, text or email distribution lists, categories of contacts, etc.). A group can be defined at any level of granularity, from a small or medium number of users (e.g., two, three, ten, twenty, thirty) who form some sort of association within a social media or similar context (e.g., members of a club, interest group, friendship circle, extended family, etc.) to large distribution lists with dozens, hundreds or thousands of members (e.g., multiple users classified as alumni of a given school, members of a given organization, etc.), to de facto groups such as all entries in the user's contacts, social media friends, friends of friends, etc.

The communicating entity rating manager 101 can use different techniques in different embodiments in order to read the data of the corresponding communication apps 301 and track the members of the groups. For example, the communicating entity rating manager 101 can request and receive corresponding permissions (e.g., at install time) from the user of the mobile computing device 300 (e.g., read contacts, read external data, etc.). In other example embodiments, the communicating entity rating manager 101 can scan communications, read notifications, use various system or app-level APIs, etc.

An identification maintaining module 307 of the communicating entity rating manager 101 maintains 403 an identification 309 of each member of the various groups of which the user of the mobile computing device 300 is a member. The format of the maintained identifications 309 can vary between embodiments, but constitutes some form of unique identifier such as a username, identification number, actual name, phone number, email address, etc. In some embodiments, the identification maintaining module 307 also maintains related or additional data concerning group members, such as their actual names, addresses, etc. In some embodiments, the identification maintaining module 307 gleans information concerning given group members from multiple sources (e.g., name and alias from a social media app, email and phone number from contacts app, etc.). The identification maintaining module 307 can store the maintained identifications 309 and other information concerning the group members in a database 311 (as illustrated in FIG. 3) or other suitable storage configuration (e.g., a flat file, linked list, b-tree, etc.).

For each identified group member, a security rating configuring module 313 of the communicating entity rating manager 101 configures 405 a corresponding security rating 315. The security ratings 315 can be initialized to a default value (e.g., zero), but are updated based on content transmitted by the group members, as described in detail below. The specific format of a security rating 315 can vary between embodiments, but is in the form of a quantification of the security risk of receiving communications from the given group member.

When group members share, transmit or otherwise provide content to the user of the mobile computing device 300, a content analysis performing module 317 of the communicating entity rating manager 101 analyzes 407 the content to determine whether it is secure. For example, the content analysis performing module 317 can intercept the communication, and scan the content. In different embodiments, different forms of security analysis can be applied to the scanned content. For example, files can be scanned using a set of signatures of known malicious code. Links embedded in the content can be compared to known or suspected malicious websites. The content of messages can be analyzed for patterns associated with spam or phishing. Active content can be run in a sandbox and subject to heuristic or other forms of security analysis.

It is to be understood that these are just examples of the types of analysis that can be performed on received content. As noted above, in some embodiments the communicating entity rating manager 101 can be implemented as part of or otherwise in conjunction with an endpoint mobile security app 301. The endpoint mobile security app 301 can in turn be in communication with a backend (e.g., cloud based) security system. In such embodiments, all of the malicious code detection mechanisms and other security analysis techniques of the mobile security app 301 and/or security system are available to the communicating entity rating manager 101 for use in this context.

Where the analysis of the content of a specific communication from a given group member to the user identifies a security concern, the security rating adjusting module 318 adjusts 409 the corresponding security rating 315 accordingly. Depending upon the severity of the identified security concern, the security rating 315 for the associated group member can be adjusted to indicate an increased risk level associated with communications from that group member. The exact amount by which to adjust a security rating 315 based on different detected incidents is a variable design parameter. For example, a communicating entity 305 sending a message containing a link to an unknown website could be classified as a minor concern, a communicating entity 305 sending an email containing a link to a phishing site of medium concern, and a communicating entity 305 distributing known malicious files to be of high concern, resulting in corresponding adjustments being made to the communicating entity's security rating 315 (e.g., the adjustments can be quantitatively proportional to the given seriousness level). In practice, more (or fewer) seriousness levels may be utilized by the communicating entity rating manager 101. In addition to the type of content, the nature of the communication (e.g., originated by the communicating entity 305, forwarded from a third party, sent only to the user, sent to the entire group, etc.) can also be utilized in adjusting the security rating 315 of the communicating entity 305.

Over time, the security ratings 315 of various group members that communicate with the user of the mobile computing device 300 are adjusted based on any suspicious/malicious transmissions. The specific content and communication characteristics described above are just examples of possible types of identified security concerns based on content/communication analysis, with example adjudications of their seriousness described according to one embodiment. What adjustments to make to security rating 315 of communicating entities 305 in response to identifications of content and other factors concerning communication are a variable design parameter.

In response to a security rating 315 for a communicating entity 305 exceeding a predetermined threshold, a security action taking module 319 of the communicating entity rating manager 101 takes 411 a corresponding security action, to protect the user of the mobile computing device 300 from the group member. In different embodiments, different security actions can be taken in this context, such as, for example, blocking communications from the group member, redacting communications from the group member (e.g., removing/deactivating links, active content, etc.), auto-deleting messages or files from the group member, transmitting a warning notification back to the group member, transmitting warning notifications to other members of the group, warning the user of the mobile computing device 300, automatically removing the user from the group, etc. Which specific security action(s) to take is a variable design parameter. By taking security actions in response to detecting group members whose activities over time are adjudicated to be sufficiently suspect and/or risky, the communicating entity rating manager 101 not only protects the user of the mobile computing device 300 from being a victim of such communicating entities 305, but also protects the user from unwittingly spreading such malicious shared content.

The specific value of the predetermined threshold at which to take one or more security actions is also a variable design parameter, and can be adjusted up or down in different embodiments, e.g., by the user of the mobile computing device 300, by the communicating entity rating manager 101, by the backend security system (e.g., using machine learning driven by telemetry received from multiple endpoints), etc.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures, and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method for protecting a first user from insecure content disseminated by other users that are members of one or more user groups of which the first user is a member, the method comprising the following steps:
   tracking communications received by a computing device and originating from specific ones of the other users that are members of one or more user groups of which the first user is a member, each user group comprising an association of users in a social media or other electronic communication distribution context;
   maintaining a corresponding unique user identifier for each specific one of the other users that are in one or more user groups of which the first user is a member;
   for each specific one of the other users that are in one or more user groups of which the first user is a member, configuring an associated security rating comprising a quantification of a security risk of receiving communication from the associated specific user;
   performing a security analysis of content received by the computing device from specific ones of the other users that are members of one or more user groups of which the first user is a member;
   adjusting security ratings associated with given users that are members of one or more user groups of which the first user is a member, responsive to given security analyses of content received by the computing device from given associated users identifying given security concerns; and
   responsive to a specific security rating associated with a specific user that is a member of one or more user groups of which the first user is a member exceeding a predefined threshold, taking a security action that prevents the first user from being exposed to communication from the specific user.

2. The method of claim 1 wherein tracking communications received by a computing device and originating from specific ones of the other users that are members of one or more user groups of which the first user is a member further comprises:
   monitoring communications received by the computing device via a plurality of user-level communication applications.

3. The method of claim 1 wherein maintaining a corresponding unique user identifier for each specific one of the other users that are in one or more user groups of which the first user is a member further comprises:

maintaining additional data concerning additional users that are in one or more user groups of which the first user is a member.

4. The method of claim 1 further comprising:
gleaning data concerning additional users that are in one or more user groups of which the first user is a member from multiple separate user-level communication applications.

5. The method of claim 1 wherein configuring a security rating comprising a quantification of security risks of receiving communication from an associated specific user further comprises:
initializing the security rating to a default value.

6. The method of claim 1 wherein performing a security analysis of content received by the computing device from specific ones of the other users that are members of one or more user groups of which the first user is a member further comprises:
intercepting communications received by the computing device from additional users that are in one or more user groups of which the first user is a member; and
scanning content of the intercepted communications.

7. The method of claim 1 wherein performing a security analysis of content received by the computing device from specific ones of the other users that are members of one or more user groups of which the first user is a member further comprises:
scanning files using a set of signatures of known malicious code.

8. The method of claim 1 wherein performing a security analysis of content received by the computing device from specific ones of the other users that are members of one or more user groups of which the first user is a member further comprises:
comparing links embedded in content to known or suspected malicious websites.

9. The method of claim 1 wherein performing a security analysis of content received by the computing device from specific ones of the other users that are members of one or more user groups of which the first user is a member further comprises:
analyzing content for patterns associated with spam or phishing.

10. The method of claim 1 wherein performing a security analysis of content received by the computing device from specific ones of the other users that are members of one or more user groups of which the first user is a member further comprises:
running active content in a sandbox; and
subjecting the running active content to heuristic analysis.

11. The method of claim 1 wherein adjusting security ratings associated with given users that are members of one or more user groups of which the first user is a member, responsive to given security analyses of content received by the computing device from given associated users identifying given security concerns further comprises:
making multiple adjustments to security ratings, each adjustment being quantitatively proportional to one of a plurality of different seriousness levels associated with an associated security analysis of received content.

12. The method of claim 1 wherein taking a security action that prevents the first user from being exposed to communication from the specific user further comprises:
blocking communications from the specific user.

13. The method of claim 1 wherein taking a security action that prevents the first user from being exposed to communication from the specific user further comprises:
redacting communications from the specific user.

14. The method of claim 1 wherein taking a security action that prevents the first user from being exposed to communication from the specific user further comprises:
auto-deleting messages or files from the specific user.

15. The method of claim 1 wherein taking a security action that prevents the first user from being exposed to communication from the specific user further comprises:
automatically removing the first user from at least one group of which the specific user is a member.

16. The method of claim 1 further comprising:
responsive to a specific security rating associated with a specific user that is a member of at least one user group of which the first user is a member exceeding a predefined threshold, transmitting at least one warning notification to at least one of: the first user, the specific user, and other members of at least one user group of which the specific user is a member.

17. The method of claim 1 further comprising:
using machine learning driven by telemetry received from multiple endpoints to set the predetermined threshold.

18. The method of claim 1 wherein:
the computing device further comprises a mobile computing device, and the steps are performed by an app running on the mobile computing device.

19. At least one non-transitory computer readable storage medium for protecting a first user from insecure content disseminated by other users that are members of one or more user groups of which the first user is a member, the at least one non-transitory computer readable storage medium storing computer executable instructions that, when loaded into computer memory and executed by at least one processor of a computing device, cause the computing device to perform the following steps:
tracking communications received by a computing device and originating from specific ones of the other users that are members of one or more user groups of which the first user is a member, each user group comprising an association of users in a social media or other electronic communication distribution context;
maintaining a corresponding unique user identifier for each specific one of the other users that are in one or more user groups of which the first user is a member;
for each specific one of the other users that are in one or more user groups of which the first user is a member, configuring an associated security rating comprising a quantification of a security risk of receiving communication from the associated specific user;
performing a security analysis of content received by the computing device from specific ones of the other users that are members of one or more user groups of which the first user is a member;
adjusting security ratings associated with given users that are members of one or more user groups of which the first user is a member, responsive to given security analyses of content received by the computing device from given associated users identifying given security concerns; and
responsive to a specific security rating associated with a specific user that is a member of one or more user groups of which the first user is a member exceeding a predefined threshold, taking a security action that prevents the first user from being exposed to communication from the specific user.

20. A computer system comprising:

system memory;

a group member tracking module residing in the system memory, the group member tracking module being programmed to track communications received by a computing device and originating from specific ones of the other users that are members of one or more user groups of which the first user is a member, each user group comprising an association of users in a social media or other electronic communication distribution context an identification maintaining module residing in the system memory, the identification maintaining module being programmed to maintain a corresponding unique user identifier for each specific one of the other users that are in one or more user groups of which the first user is a member;

a security rating configuring module residing in the system memory, the security rating configuring module being programmed to configure, for each specific one of the other users that are in one or more user groups of which the first user is a member, an associated security rating comprising a quantification of a security risk of receiving communication from the associated specific user a content analysis performing module residing in the system memory, the content analysis performing module being programmed to perform a security analysis of content received by the computing device from specific ones of the other users that are members of one or more user groups of which the first user is a member;

a security rating adjusting module residing in the system memory, the security rating adjusting module being programmed to adjust security ratings associated with given users that are members of one or more user groups of which the first user is a member, responsive to given security analyses of content received by the computing device from given associated users identifying given security concerns;

a security action taking module residing in the system memory, the security action taking module being programmed to take, responsive to a specific security rating associated with a specific user that which is a member of one or more user groups of which the first user is a member exceeding a predefined threshold, a security action that prevents the first user from being exposed to communication from the specific user; and at least one processor configured to execute the modules.

* * * * *